United States Patent Office 2,965,448
Patented Dec. 20, 1960

2,965,448

A NEW CRYSTALLINE FORM OF SILICA AND ITS PREPARATION

Conrad L. Hoover, Wilmington, Del., assignor to E. I. du Pont de Nemours and Company, Wilmington, Del., a corporation of Delaware No Drawing. Filed Aug. 31, 1954, Ser. No. 453,447

10 Claims. (Cl. 23—182)

This invention relates to hydrothermal treatment of existing forms of silica and to preparation of novel siliceous material therefrom.

As is well known, quartz, tridymite, and cristobalite are different native forms of essentially pure silica. Each of these forms is crystalline and each is enantiotropic: exhibiting densities, refractive indexes, and X-ray diffraction patterns characteristic of at least two distinguishable phases (three for tridymite). Stability of the various modifications depends upon temperature and pressure: at atmospheric pressure, quartz is the equilibrium form below about 870° C., having a transition near 573° C. from the alpha or low-temperature phase to the beta or high-temperature phase; tridymite is the equilibrium form between about 870° C. and 1470° C. with transitions near 117° C. from the alpha or low-temperature phase to the beta$_1$ or lower high-temperature phase and near 163° C. from the latter to the beta$_2$ or upper high-temperature phase; cristobalite is the equilibrium form above about 1470° C. for a range of several hundred degrees up to a point at which the material fuses into an amorphous form usually called "vitreous." Once formed, vitreous silica exists at lower temperatures with little evidence of instability, and the various crystalline modifications may exist for appreciable time outside their respective stable ranges. Furthermore, both amorphous and crystalline forms of silica can occur finely divided or colloidal in dimension, as granules and fibers.

Transition of silica from one phase to another is accompanied by changes in density and other physical characteristics, as might be expected. Although superior to many other materials in which unrelieved stresses arise under severe conditions (e.g., rapid temperature change), silica is subject to eventual fracturing of the structure from attendant strain. This failing limits the practicable variation in temperature of refractory linings for furnaces and the like, one of the most important uses of siliceous materials, because of the risk of fracture and consequent necessity for replacement of the lining, which is expensive and time-consuming. The ability of silica to withstand high temperatures without melting also prompts its use in reaction vessels, thermometers, and the like; however, these suffer from a similar propensity to frangibility upon repeated heating and cooling.

An object of the present invention is provision of thermally infrangible siliceous material. A further object is production of unique crystalline silica from finely divided silica. Other objects will be apparent from the following description of the invention.

In general, the objects of this invention are accomplished by treating ordinary forms of silica in supercritical water, as at absolute temperature approaching a thousand degrees and at pressure of at least fifteen hundred atmospheres, to obtain a form of crystalline silica exhibiting phase stability, i.e., absence of phase change, from ordinary room temperature to a temperature well above one thousand degrees centigrade. The invention comprehends hydrothermal treatment of silica at temperature of at least 450° C. and pressure of at least 1500 atmospheres, the new form of silica produced thereby being characterized, in addition to the wide range of phase continuity mentioned above, by refractive index $n_D^{25}$ of 1.52, density in air at room temperature of 2.47 grams per cc., and intracrystalline interplanar spacings of 3.75, 3.45, and 1.87 A.

The product of this invention is separate and distinct from all known forms of silica hitherto existing. In the following exemplification of this invention, parts and percentages are by weight unless otherwise indicated.

*Example I*

A platinum reaction vessel, is charged with 10.5 parts of a 5% deionized aqueous silica sol after being collapsed to 69% of its expanded volume. The sealed vessel is then placed in a larger corrosion-resistant pressure vessel otherwise filled with water. The latter is heated externally to 600° C. for 10 hours with sufficient relief of pressure to maintain the pressure on the inner vessel in the range 2900–3100 atmospheres. The slurry is dried to obtain a sample for X-ray diffraction analysis, which shows the material to be a new silica phase.

*Example II*

A charge of 5 parts of activated alumina and 5 parts of silicic acid, containing 88% $SiO_2$ and 0.2% alkali salts, and 108 parts of water is placed in a pressure-resistant vessel. An initial water pressure of 200 atmospheres is applied and the vessel is heated externally to 625° C. Pressure is released to avoid rupture of the vessel and maintain the pressure at 2800–3100 atmospheres. These pressure conditions are held for three hours. The vessel is then cooled and the product is isolated by filtration. Microscopic examination shows the presence of small square crystals having an index of refraction slightly below those of alpha low quartz. X-ray diffraction analysis shows, in addition to a weak corundum pattern, a pattern attributed to a new form of silica and characterized by strong lines corresponding to interplanar spacings of 3.76 and 3.45 A. and a weaker line at 1.87 A.

*Example III*

A charge of 5 parts of silicic acid, containing 88% $SiO_2$, is charged into a pressure-resistant vessel which is then filled with deoxygenated water. The vessel is heated externally to 625° C. for 3 hours under pressure, with relief of excess pressure as required to maintain the pressure in the 2900–3100 atmosphere range. After being cooled under pressure, the product, isolated by filtration, has an $n_D^{25}$ of 1.51. X-ray diffraction analysis shows, in addition to traces of alpha low quartz and tridymite, that the product is essentially all a new silica phase characterized by strong lines at 3.74, 3.44 and 3.13 A. and a weak line at 1.87 A.

The above experiment is repeated using 15 parts of silicic acid containing 88% $SiO_2$. The product shows an X-ray diffraction pattern corresponding closely to that in the above experiment. The density of the product, determined by volume displacement is 2.47 grams per cc., and its average $n_D^{25}$ is 1.52. Analysis by flame spectrophotometry indicates that the washed product contains 0.022% sodium and 0.22% potassium. When heated up to 1100° C., this material shows no crystalline phase changes.

Repetition of the above experiment at 900–1100 atmospheres yielded a mixture of cristobalites with no indication of the new silica of this invention.

*Example IV*

The procedure of Example I is used except that the temperature is maintained in the range of 500° C. during the treatment period. X-ray diffraction analysis shows the product to be mainly the new silica phase with a small amount of alpha low quartz present.

The procedure of the above example is repeated with a charge of 20 parts of silicic acid, containing 88% $SiO_2$, and 0.10 part 0.85% potassium hydroxide, equivalent to 7.7 K per 1000 $SiO_2$. The product gives an X-ray diffraction analysis showing alpha low quartz as the major constituent, with only a trace of the new silica phase indicated by a faint line of 3.71 A.

*Example V*

A charge of 0.60 part of finely divided pure amorphous silica to which is added 0.006 part of potassium (as hydroxide) is charged into a platinum reaction vessel equipped with relief vents. Forty-five parts of water is used to fill the vessel. This is placed in a larger corrosion-resistant vessel otherwise filled with water. The assembly is then pressured to 500 atmospheres water pressure and heated to 625° C. for 3 hours under pressure, with relief of sufficient pressure to maintain the pressure in the range of 2800–3200 atmospheres. The product proves by X-ray diffraction analysis to be essentially all the new silica phase, containing less than 8% alpha low quartz, as evidenced by strong lines at 3.74, 3.42 and 1.88 A.

In the above examples, crystallinity characteristics of the product were determined by well-known methods, using a Debye-Scherrer powder camera (diameter 114.6 mm.) and a Geiger-Müller diffractometer (General Electric manufacture). Differential thermal analysis (method described in J. Am. Ceramic Soc. 35, 76–82, March 1952), was employed as a detector for crystalline phase change. The product also was observed by electron microscope to crystallize in flat square form, apparent substantially tetragonal. The product falls in place on the straight-line relationship of refractive index vs. density for known forms of silica, which extends from about 1.46, 2.20 (vitreous) to 1.55, 2.65 (quartz) and to 1.60, 3.01 for a recently reported dense form of silica.

Commercial silicic acid, which normally contains a few tenths percent of alkali metals in salt form, is a convenient precursor of the new silica of this invention because of ready availability and relatively lower cost. In place of it any ordinary form of silica may be used, thus including the minerals cristobalite and tridymite, as well as any of the finely divided amorphous or crystalline siliceous materials obtained by methods well known to those skilled in the art. The presence of alkali favors formation of the product of this invention, and the starting material preferably contains from one to ten gram-atoms of alkali metal per thousand gram-molecules of silica.

Time, temperature, and pressure of reaction are somewhat interdependent here. Usually a processing time on the order of hours should suffice for conversion of the siliceous starting material to the product of this invention; no advantage should be expected for extension of the time to more than about fifteen hours. The reaction temperature should not exceed about seven hundred degrees centigrade because of appreciable formation of quartz beginning thereabout and increasing considerably above that temperature, but for ready reaction at least four hundred fifty degrees should be attained. No upper limit of pressure is apparent, being determined solely by structural limitations of readily available equipment; however, about fifteen hundred atmospheres has proved to constitute a satisfactory lower limit of pressure within the effective range of temperature. As a rule, use of higher pressure reduces the time and temperature essential for conversion of the starting material to the product of this invention.

Besides being useful as a filler in paints, plastics, and rubbers (natural and synthetic) the product of this invention is useful as an abrasive component of cleaning compositions. Furthermore, it is a particularly desirable constituent of fire brick and refractory coatings generally, in which it may be associated with the usual adhesive or clay binders. Other advantages of the practice of this invention will come readily to mind.

The claimed invention:

1. The crystalline form of silica characterized by exhibiting on X-ray diffraction analysis a pattern of two strong lines corresponding to interplanar spacings of about 3.75 A. and 3.45 A. and a third weaker line corresponding to an interplanar spacing of about 1.87 A.

2. The crystalline form of silica characterized by having the same crystalline phase from 20° C. to at least 1100° C., and exhibiting on X-ray diffraction analysis a pattern of two strong lines corresponding to interplanar spacing of about 3.75 A. and 3.45 A. and a third weaker line corresponding to an interplanar spacing of about 1.87 A.

3. The crystalline form of silica characterized by having the same crystalline phase from 20° C. to at least 1100° C., a density in air at 20° C. of 2.47 grams per cubic centimeter, and exhibiting on X-ray diffraction analysis a pattern of two strong lines corresponding to interplanar spacings of about 3.75 A. and 3.45 A. and a third weaker line corresponding to an interplanar spacing of about 1.87 A.

4. The crystalline form of silica characterized by having the same crystalline phase from 20° C. to at least 1100° C., a refractive index $n_D^{25}$ in the range of 1.51 to 1.52, a density in air at 20° C. of 2.47 grams per cubic centimeter, a tetragonal crystal structure, and exhibiting on X-ray diffraction analysis a pattern of two strong lines corresponding to interplanar spacings of about 3.75 A. and 3.45 A. and a third weaker line corresponding to an interplanar spacing of about 1.87 A.

5. A refractory material comprising the crystalline form of silica set forth in claim 2.

6. Process which comprises heating silica in mixture with water at a temperature within the range of 450 to 700° C. and under a pressure within the range of 1500 to 3200 atmospheres, said silica being selected from the class consisting of finely divided amorphous silica and crystalline silica having a phase transition temperature within the range of 20° C. to 1100° C., and recovering as the resulting product the crystalline form of silica characterized by exhibiting on X-ray diffraction analysis a pattern of two strong lines corresponding to interplanar spacings of about 3.75 A, and 3.45 A. and a third weaker line corresponding to an interplanar spacing of about 1.87 A.

7. Process which comprises heating silica in an aqueous medium at a temperature within the range of 450 to 700° C. and under a pressure within the range of 1500 to 3200 atmospheres, said silica being selected from the class consisting of finely divided amorphous silica and crystalline silica having a phase transition temperature within the range of 20° C. to 1100° C., and recovering as the resulting product the crystalline form of silica characterized by exhibiting on X-ray diffraction analysis a pattern of two strong lines corresponding to interplanar spacings of about 3.75 A. and 3.45 A. and a third weaker line corresponding to an interplanar spacing of about 1.87 A.

8. Process as set forth in claim 7 in which the finely divided silica is an aqueous sol of amorphous silica.

9. Process as set forth in claim 7 in which the aqueous medium contains from 1 to 10 gram-atoms of alkali metal per 1000 gram-molecules of silica.

10. Process which comprises heating silica in an aqueous medium at a temperature within the range of 500 to 625° C. and under a pressure of 2800 to 3200 atmospheres, said silica being selected from the class consisting of finely divided amorphous silica and crystalline silica having a phase transition temperature within the range of 20° C. to 1100° C., and recovering as the resulting produce the crystalline form of silica characterized by exhibiting on X-ray diffraction analysis a pattern of two strong lines corresponding to interplanar spacings of about 3.75 A. and 3.45 A. and a third weaker line corresponding to an interplanar spacing of about 1.87 A.

References Cited in the file of this patent

UNITED STATES PATENTS

| | | |
|---|---|---|
| 1,539,342 | Williams | May 26, 1925 |
| 2,249,767 | Kistler | July 22, 1941 |
| 2,698,305 | Plank et al. | Dec. 28, 1954 |

OTHER REFERENCES

Coes: "Science," vol. 118, July 31, 1953, pp. 131–132.

Keat: "A New Crystalline Silica," in "Science," vol. 120, pages 328 to 330, Aug. 27, 1954.